United States Patent Office 3,642,945
Patented Feb. 15, 1972

3,642,945
POLYOLEFIN-POLYETHERESTER ALLOY
James W. Cleary, Bartlesville, Okla., assignor to
Phillips Petroleum Company
No Drawing. Filed May 12, 1970, Ser. No. 36,687
Int. Cl. C08f 29/10
U.S. Cl. 260—873    10 Claims

ABSTRACT OF THE DISCLOSURE

A blend comprising an intimate mixture of polyolefinic material and from about 1 to about 35 weight percent, based on the weight of polyolefin, of a polyetherester derived from bis(hydroxyethoxy)benzene and its homologs are readily spun to fibers having an improved dye receptivity in comparison to unmodified polyolefinic material.

---

This invention relates to new and valuable chemical compositions comprising a blend of normally incompatible polymers which are readily spun into fibers and filaments having improved dye receptivity and to processes for preparing such compositions.

Polyolefinic materials are well known articles of commerce which have experienced wide acceptance in forming shaped objects and film or sheet material. The use of such materials has extended to the fiber and fabric industries, due in no small measure to their excellent soil resistance and antistatic properties. Fibers formed from polyolefinic materials, however, are difficult to dye and, in general, resist dyeing by conventional procedures. The approaches which have been taken to improve the dyeability of polyolefin fibers include graft polymerization with dye receptive monomers; blending with polymers such as polyurethanes, polyamides, epoxy resins, and the like; and incorporating certain additives which are themselves capable of taking up the dyestuff or reacting with it chemically. These approaches have not been entirely adequate or practical because the auxiliary materials are generally difficult to incorporate into the polyolefin or adversely affect the formed fibers. Perhaps the most promising approach to a solution of the problem of dyeing polyolefinic materials is the incorporation of linear polyesters into the polyolefinic compositions to form polymer alloys. However, the selection of a particular polyester to be blended with the polyolefin such that a usable polymer alloy will be obtained is not readily determinable because of the normal incompatibility of the two divers materials. For example, polypropylene-poly(ethylene succinate) compositions have been found to be not spinnable; polypropylene-poly(1,2-propylene sebacate) compositions are spinnable but produce fibers of questionable quality; some polypropylene - poly(ethylene isophthalate-terephthalate) compositions will spin, whereas other will not; polypropylene-poly(ethylene phthalate) compositions are not spinnable; polypropylene - poly(ethylene terephthalate) compositions are spinnable but manifest pressure buildup at the spinneret, making continuous operation impossible. Thus, it is generally not possible to predict whether a particular polyolefin-polyester polymer alloy will have acceptable properties.

The problem is well illustrated by blends comprising fro about 10 to 85 weight percent of a polyolefin and from 15 to 90 percent of a dissimilar polymer such as polyester, polyamide or styrene-acrylonitrile copolymer. Although such blends have been found advantageous for a few specific purposes, in many instances deficiencies have become apparent. For example, when the minor component is used as a dye receptor additive, as is frequently the case, the incompatibility of the polymers results in nonuniform dyeing and produces difficulties in obtaining deep shades. The problem is more severe the more nearly equal the proportions of the compositions, and also the more dissimilar their viscosities at the same temperature. In addition, quite often the blends comprising polyolefin and a dissimilar normally incompatible material such as polyester cannot be spun satisfactorily into fibers having the desired processing characteristics under any spinning conditions.

I have discovered that when polyolefin materials are admixed in accordance with the invention with certain hereinafter described linear aromatic polyetheresters, the mixture can be readily spun into fibers which retain the good mechanical properties of unmodified polyolefin compositions while having an improved dye receptivity in comparison to unmodified polyolefin compositions.

The aromatic polyetheresters used in practicing the invention are the polycondensation products of an aromatic hydroxy ether having the formula:

or

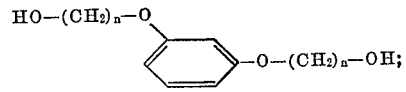

wherein $n$ is an integer from 1–10, and terephthalic acid or its lower alkyl esters such as dimethyl terephthalate or dibutyl terephthalate. The polyetheresters of the invention are composed of recurring structural units having the formula:

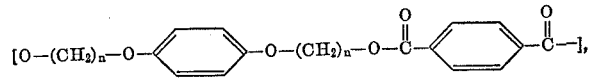

or

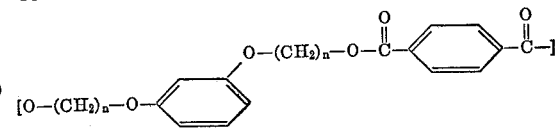

wherein $n$ is as previously defined, said polyetheresters having terminal hydroxyl or carboxyl groups. The polyetherester to be used is admixed with the fiber-forming polyolefin prior to extrusion to form a homogeneous blend. The blend is readily extrudable through suitable spinnerets to form directly monofilaments, multifilament yarns, rods, ribbons, films, and the like. Extruded rods, etc., may be pelletized to form a raw material for remelting.

The poly[1,4 - bis(alkyleneoxy)benzene terephthalate] or poly[1,3-bis(alkyleneoxy)benzene terephthalate] modifier which is admixed with the fiber-forming polyolefin material should exhibit a glass transition temperature below about 50° C., should not decompose at the spinning temperature; should have a melting point above 100° C. and below about 250° C., preferably in the range of 120° C. to 220° C.; and have a molecular weight sufficiently high to prevent vaporization at spinning temperatures, preferably in the range of 2,000 to 25,000. Generally, the polyetherester modifiers of the invention will be used in amounts in the range of 1 to 35 weight percent, based on weight of polyolefinic material. It is preferred to use an amount in the range of 2 to 20 weight percent, and more particularly, in the range of 7 to 15 weight percent. Mixtures in varying amounts of two or more of the polymeric modifiers may be used if desired.

The use of the polymeric modifiers of the invention to modify the dyeability of polyolefinic materials does not deleteriously affect forming the blends into fibers and then stretching and stabilizing the films and yarns. These operations are carried out in the same manner and under the same conditions as are used with a melt or solution of the polyolefin material per se.

The fibers produced from the blends of the invention have mechanical properties which are substantially the same as unmodified polyolefin fibers but with a significantly improved dye receptivity in comparison thereto.

dye bath ratio, with the bath containing about 2 percent by weight of a 20 percent solution of a nonionic surfactant and about 2 percent of the dye, based on the original weight of fiber (OWF). The dyeing is carried out for 60 minutes at the boil and the fiber is rinsed thoroughly and dried. The results of the dyeing are reported in Table I.

TABLE 1

| Run | Polyolefin modifier | Color yield [a] | Light fastness [b] |
|---|---|---|---|
| 1 | None | 1.3 (1) | <2/5 |
| 2 | do | 2.6 (2) | 2/5 |
| 3 | do | 3.1 (3) | <2/5 |
| 4 | Poly[1,4-bis(ethyleneoxy)benzene terephthalate] | 5.29 (1) | 5/40 |
| 5 | do | 7.65 (2) | 3/20 |
| 6 | do | 6.50 (3) | 3/20 |

[a] Color yield on deep dyeing (2% level OWF) using (1) Calcosyl Yellow, GCN; (2) Polydye Red, BC; (3) Genacron Blue, GR.
[b] Measured by comparison with a Blue Wool standard sample rating 1-8/hrs., with 8 the highest rating.

The polyolefin materials which are treated in accordance with the invention include the fiber and film-forming polymers such as polyethylene, polypropylene, poly-4-methyl-1-butene, poly-4-methyl-1-pentene, poly-1-butene, polystyrene, polyallylbenzene and polyvinylcyclohexane. Such materials also encompass the fiber and film-forming copolymers of monoolefins, having from 2 to 12 carbon atoms, for example ethylene-propylene, ethylene-butene-1, ethylene-hexene-1 copolymers. This additive and method is particularly useful to improve the dyeability of polypropylene. Generally, the polyolefinic material will have weight average molecular weights in the range of about 100,000 to about 500,000.

The following examples are illustrative of the invention.

EXAMPLE I

Poly[1,4-bis(ethyleneoxy)benzene terephthalate] is prepared by the reaction of 1,4-bis(hydroxyethoxy)benzene and terephthalic acid in the usual manner. The solid polymer has the following properties (by Differential Thermal Analysis):

| | °C. |
|---|---|
| $T_m$ (melting point) | 197 |
| $T_c$ (premelt crystallization) | 94 |
| $T_{c_1}$ (premelt crystallization) | 159 |
| $T_f$ (freezing point) | 154 |
| $\eta$ (Inherent viscosity) | [1] 0.17 |

[1] 0.5 g. in 100 ml. mixture of 60% phenol and 40% tetrachloroethane by volume measured at 30° C.

EXAMPLE II

In a series of runs, fibers are spun from unmodified polyolefin compositions (runs 1-3) and from polyolefin compositions containing 10 phr. (parts by weight per hundred parts of polyolefin) of the poly[1,4-bis-(ethyleneoxy)benzene terephthalate] modifier from Example I. The fibers are dyed with Calcosyl Yellow-GCN, Polydye Red-BC and Genacron Blue-GR dyes, using a 50:1

This example demonstrates the significant improvement in dyeability of polyolefin fibers prepared according to this invention over unmodified polyolefin compositions.

EXAMPLE III

In a series of runs, 100 parts by weight of fiber-forming propylene is blended with a polyester modifier and the blend is spun and drawn. The data obtained in these runs is summarized in the following tabulation:

TABLE II

| Run | Polyester modifier | Amount (phr.) [1] | Spin back pressure increase (p.s.i./min.) |
|---|---|---|---|
| 7 | Poly(ethylene succinate) | 10 | [2] |
| 8 | Poly(ethylene adipate) | 10 | [2] |
| 9 | Poly(ethylene phthalate) | 10 | [2] |
| 10 | Poly(ethylene terephthalate) 5,000 M.W. | 5 | [3] 30 |
| 11 | Poly(ethylene isophthalate/terephthalate) 50/50 | 10 | [2] |
| 12 | Poly(1,2-propylene sebacate) 2,120 M.W. | 10 | [4] 0 |
| 13 | Poly(1,2-propylene sebacate) 1,330 M.W. | 10 | [4] 0 |
| 14 | Poly(ethylene terephthalate) 2,020 M.W. | 10 | [4] 0 |
| 15 | Poly[1,4-bis(ethyleneoxy)benzene terephthalate] | 10 | [5] 0 |

[1] Parts by weight of modifier per 100 parts by weight of polyolefin.
[2] Would not spin.
[3] Pressure buildup indicates blend not suitable for extended spinning. Fiber quality of blend is acceptable.
[4] Blends were not homogeneous. Surface of blends coated with polyester additive. Extruded pellets are sticky and would not flow. Fiber quality of blend is unacceptable.
[5] Polyetherester additive of invention. Fiber quality of blend is acceptable.

The foregoing example demonstrates the unpredictability of polyester modifiers in improving dye receptivity of polyolefinic compositions without adversely affecting spinnability or other properties.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A dyeable, substantially stable, extrudable melt blend comprising fiber-forming polyolefinic material and from about 1 to about 35 percent, based on the weight of polyolefin, of a polyetherester composed of recurring structural units of the formula:

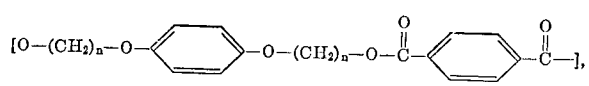

or

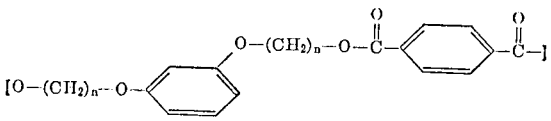

wherein $n$ is an integer of 1 to 10.

2. A composition of matter according to claim 1 wherein said polyetherester is present in an amount in the range of 2 to 20 weight percent.

3. A composition of matter according to claim 2 wherein said polyetherester is present in an amount in the range of 7 to 15 weight percent.

4. The composition of claim 2 wherein said polyetherester is poly[1,4-bis(ethyleneoxy)benzene terephthalate].

5. The composition of claim 2 wherein said polyetherester has a molecular weight in the range of 2,000 to 25,000, a second order glass transition temperature below about 50° C., and a melting point in the range of 100 to 250° C.

6. A composition according to claim 5 wherein said polyetherester has a molecular weight in the range of 2,000 to 25,000 and a melting point in the range of 120° to 220° C.

7. The method of improving dye receptivity of a polymer or copolymer of monoolefins of 2 to 12 carbon atoms comprising forming an intimate blend of said polyolefin and from 1 to 35 weight percent, based on weight of polyolefin of a linear condensation polyetherester composed of recurring structural units of the formula:

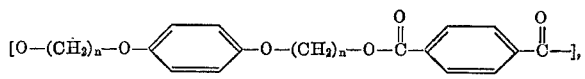

or

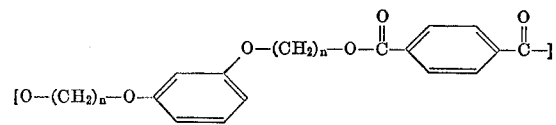

wherein $n$ is an integer of 1 to 10.

8. The method of claim 7 wherein the amount of said polyetherester is in the range of 2 to 20 weight percent.

9. The method of claim 8 wherein said polyetherester has a molecular weight in the range of 2,000 to 25,000; a second order glass transition temperature below about 50° C.; and a melting point in the range of 100° to 250° C.

10. The method of claim 9 wherein said polyetherester is poly[1,4-bis(ethyleneoxy)benzene terephthalate].

References Cited

UNITED STATES PATENTS

| | | |
|---|---|---|
| 2,762,789 | 9/1956 | Fisher et al. |
| 2,973,339 | 2/1961 | Muenster et al. |
| 3,223,752 | 12/1965 | Tate et al. |
| 3,419,638 | 12/1968 | Fuzek. |

FOREIGN PATENTS

| | | |
|---|---|---|
| 1,054,303 | 1/1967 | Great Britain. |

MELVIN GOLDSTEIN, Primary Examiner

U.S. Cl. X.R.

8—DIG. 9